United States Patent
Boily

(10) Patent No.: US 7,292,568 B2
(45) Date of Patent: Nov. 6, 2007

(54) TIMESLOT INTERCHANGE SWITCH

(75) Inventor: Patrick Boily, Burnaby (CA)

(73) Assignee: Alcatel-Lucent Canada Inc., Ottawa (CA)

( * ) Notice: Subject to any disclaimer, the term of this patent is extended or adjusted under 35 U.S.C. 154(b) by 1064 days.

(21) Appl. No.: 10/180,129

(22) Filed: Jun. 27, 2002

(65) Prior Publication Data

US 2004/0001454 A1    Jan. 1, 2004

(51) Int. Cl.
*H04Q 11/04* (2006.01)
*H04L 12/54* (2006.01)

(52) U.S. Cl. ...................... 370/376; 370/429

(58) Field of Classification Search ............... 370/314, 370/360, 386, 390, 395.4, 395.7, 395.71, 370/412, 458, 375, 376, 345, 429, 498
See application file for complete search history.

(56) References Cited

U.S. PATENT DOCUMENTS

| | | | |
|---|---|---|---|
| 5,841,771 A | 11/1998 | Irwin et al. | |
| 5,892,922 A * | 4/1999 | Lorenz | 709/238 |
| 6,064,670 A | 5/2000 | Athenes et al. | |
| 6,259,703 B1 * | 7/2001 | Gray | 370/458 |
| 6,324,176 B1 * | 11/2001 | Bodnar et al. | 370/376 |
| 6,587,459 B1 * | 7/2003 | Suda et al. | 370/369 |
| 2002/0006128 A1 * | 1/2002 | Yehuda et al. | 370/390 |
| 2002/0024949 A1 * | 2/2002 | Tomonaga et al. | 370/389 |
| 2003/0026287 A1 * | 2/2003 | Mullendore et al. | 370/442 |

* cited by examiner

*Primary Examiner*—Doris H. To
*Assistant Examiner*—Feben Micael Haile
(74) *Attorney, Agent, or Firm*—Oyen Wiggs Green & Mutala LLP

(57) ABSTRACT

A timeslot interchange switch has a three stage pipelined construction. A cross-connect stage identifies egress timeslots for which there is a corresponding data source. The cross connect stage has a set of flags which indicate whether or not there is a data source for each of a plurality of egress timeslots. The cross connect stage takes the flags in groups. If one or more flags in a group indicates an egress timeslot has a corresponding data source then information identifying the egress timeslot is passed to a connection scheduler via a FIFO. The connection scheduler looks up the data source for each the egress timeslot.

25 Claims, 6 Drawing Sheets

US 7,292,568 B2

TIMESLOT INTERCHANGE SWITCH

TECHNICAL FIELD

The invention relates to switches for switching time-multiplexed signals.

BACKGROUND

A timeslot interchange switch receives one or more input streams of time domain multiplexed (TDM) data and sends out one or more output streams of TDM data. The input and output data each comprise a plurality of timeslots. The switch places data received in each timeslot of the input data into a timeslot of the output data. The capacity of such switches is limited by the rate at which the switch can identify the output timeslot into which data from an input timeslot should be placed.

Irwin et al., U.S. Pat. No. 5,841,771 discloses one type of timeslot interchange switch. Athenes et al. U.S. Pat. No. 6,064,670 discloses a matrix for switching between two time division multiplex groups. Each of these switches comprises a memory which stores cross connection information. The information can be updated only when the memory is not being accessed by the switch to switch data.

There is a need for timeslot interchange switches which offer improved capacity and/or better cost to capacity ratios. There is also a need for switches in which the cross-connect information can be updated while the switch is operating.

SUMMARY OF THE INVENTION

This invention provides methods and apparatus for inserting data into timeslots in one or more TDM signals. A first aspect of the invention provides a method for switching data to timeslots of one or more outgoing TDM signals. The method comprises maintaining a set of flags. The flags indicate whether there is a data source for each of a plurality of available timeslots of the outgoing TDM signals. The method proceeds by, from the set of flags, identifying a number of timeslots of the outgoing TDM signals for which there are data sources. The method looks up each of the number of timeslots of the outgoing TDM signals in a cross-connect lookup table to identify a data source corresponding to each of the number of timeslots of the outgoing TDM signals. For each of the number of timeslots of the outgoing TDM signals, the method copies data from the data source to a location corresponding to the timeslot of the outgoing TDM signal.

Another aspect of the invention provides a timeslot interchange switch. The switch comprises an egress buffer and a cross connect stage. The cross connect stage comprises a set of flags, the set of flags including a flag corresponding to each of a plurality of available timeslots; an active connection finder circuit connected to the flags and operative to generate signals identifying any flags in the set of flags which are set to indicate that a corresponding one of the plurality of timeslots is active; and a connection scheduler circuit responsive to the signals from the active connection finder circuit and operative to look up a location of a data source for each of the active timeslots and to copy data from the data source to a location in the egress buffer corresponding to the active timeslot.

A further aspect of the invention provides a cross-connect stage for a timeslot interchange switch. The cross-connect stage comprises a means for identifying a number of timeslots of the outgoing TDM signals for which there are data sources; a means for looking up each of the number of timeslots of the outgoing TDM signals in a cross-connect lookup table to identify a data source corresponding to each of the number of timeslots of the outgoing TDM signals; and, a means for copying data for each of the number of timeslots of the outgoing TDM signals from the corresponding data source to a location corresponding to the timeslot.

Further aspects of the invention and features of specific embodiments of the invention are described below.

BRIEF DESCRIPTION OF THE DRAWINGS

In drawings which illustrate embodiments of the invention.

Figure 1:
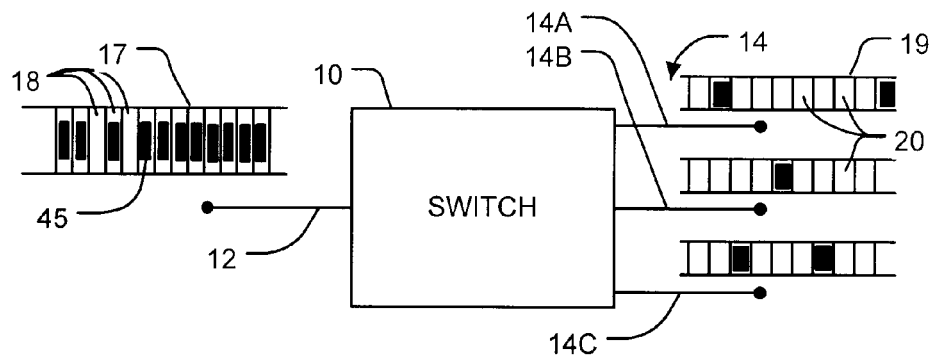
FIG. 1 is a schematic view of a generic timeslot interchange switch.

The invention is not limited to the embodiments illustrated in the drawings.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

FIG. 1 shows a generic timeslot interchange switch 10. Switch 10 has at least one input 12 and at least one output 14. The illustrated switch 10 has one input 12 and three outputs 14 (individually identified by the reference numerals 14A, 14B, and 14C). A timeslot interchange switch 10 may have any reasonable number of inputs and outputs.

Input 12 receives a data signal 17 which can contain data 45 in each of a series of timeslots 18. Outputs 14 put out data signals 19 which can contain data in each of a series of timeslots 20. The data may represent information of any type. For example, the data may comprise voice data, video data, general data or the like. The data passes through switch 10 on its way from data sources to data destinations.

Figure 2:
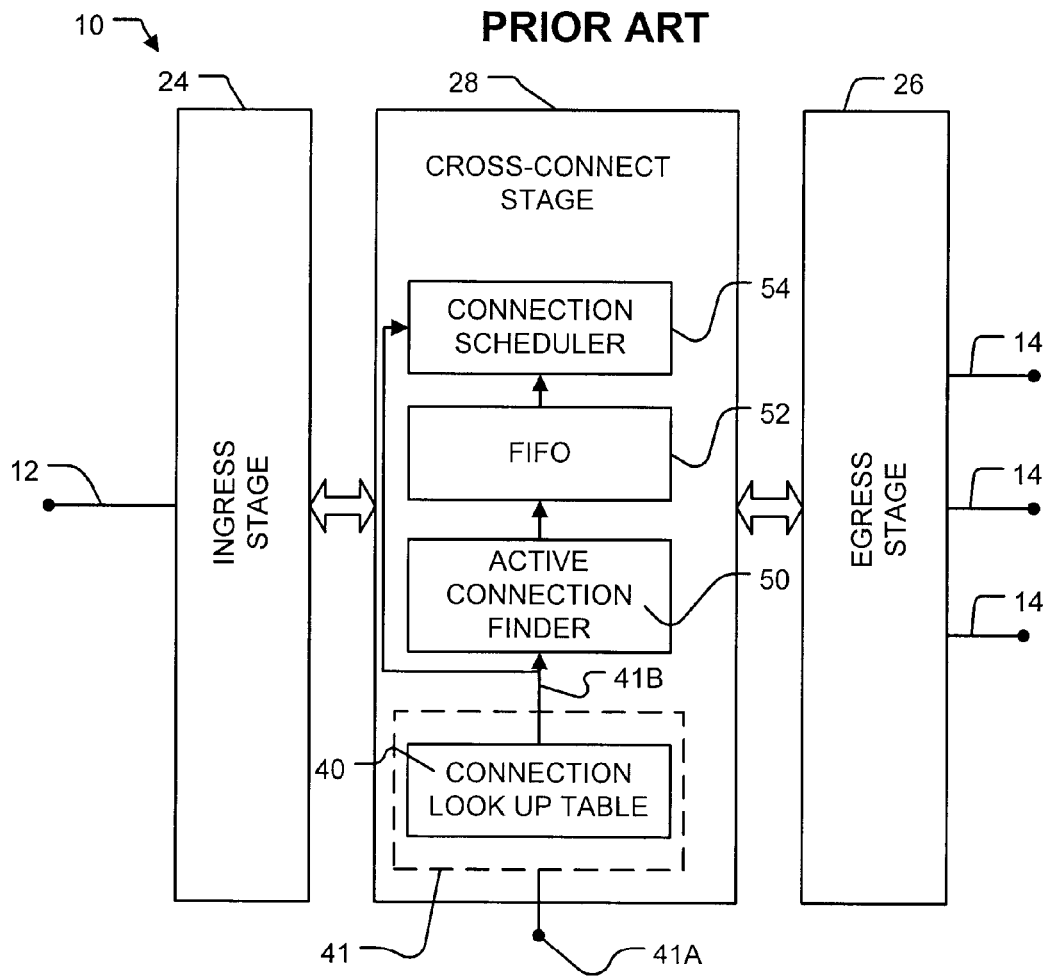
FIG. 2 is a block diagram of a timeslot interchange switch according to the invention.

FIG. 2 shows a timeslot interchange switch according to this invention. Switch 10 comprises an ingress stage 24, an egress stage 26 and a cross-connect stage 28 coupled between ingress stage 24 and egress stage 26. Ingress stage 24 receives data from an input 12 and holds the data in a buffer 30 (see FIG. 3). Buffer 30 is accessible to cross-connect stage 28. Egress stage 26 comprises an egress buffer 32 which is also accessible to cross-connect stage 28.

The operation of switch 10 is pipelined. Ingress stage 24 places data which arrives during one frame into ingress buffer 30. During a next frame cross-connect stage 28 copies the data from ingress buffer 30 to locations in egress buffer 32 which, according to a connection lookup table 40, correspond to output timeslots 20 into which it is desired to place each item of data. It is not necessary that all data from ingress buffer 30 be copied to a location in egress buffer 32. Some data which is received at switch 10 may be dropped in switch 10. During a third frame egress stage 26 places data from egress buffer 32 onto outputs 14. Each frame may be, for example, a standard telecommunication frame lasting 125 μs.

By way of example only, input 12 may receive data from an OC3 data link comprising approximately 2016 TDM channels each having a bandwidth of 64 kBps (kilobits per second). Input 12 may receive data by way of a frame mapper. For example, in one embodiment of the invention, input 12 is connected to the scalable bandwidth interconnect (SBI) bus of a frame mapper such as a model TEMAP-84 available from PMC-Sierra, Inc. of Burnaby, B.C., Canada. Outputs 14 may comprise serial outputs each carrying fewer TDM channels (i.e. fewer timeslots 20 per frame). In some embodiments of the invention, outputs 14 collectively provide many more TDM channels than input 12. For example, the number of egress timeslots 20 may exceed the number of ingress timeslots 18 by a factor of 5 or more.

Figure 3:
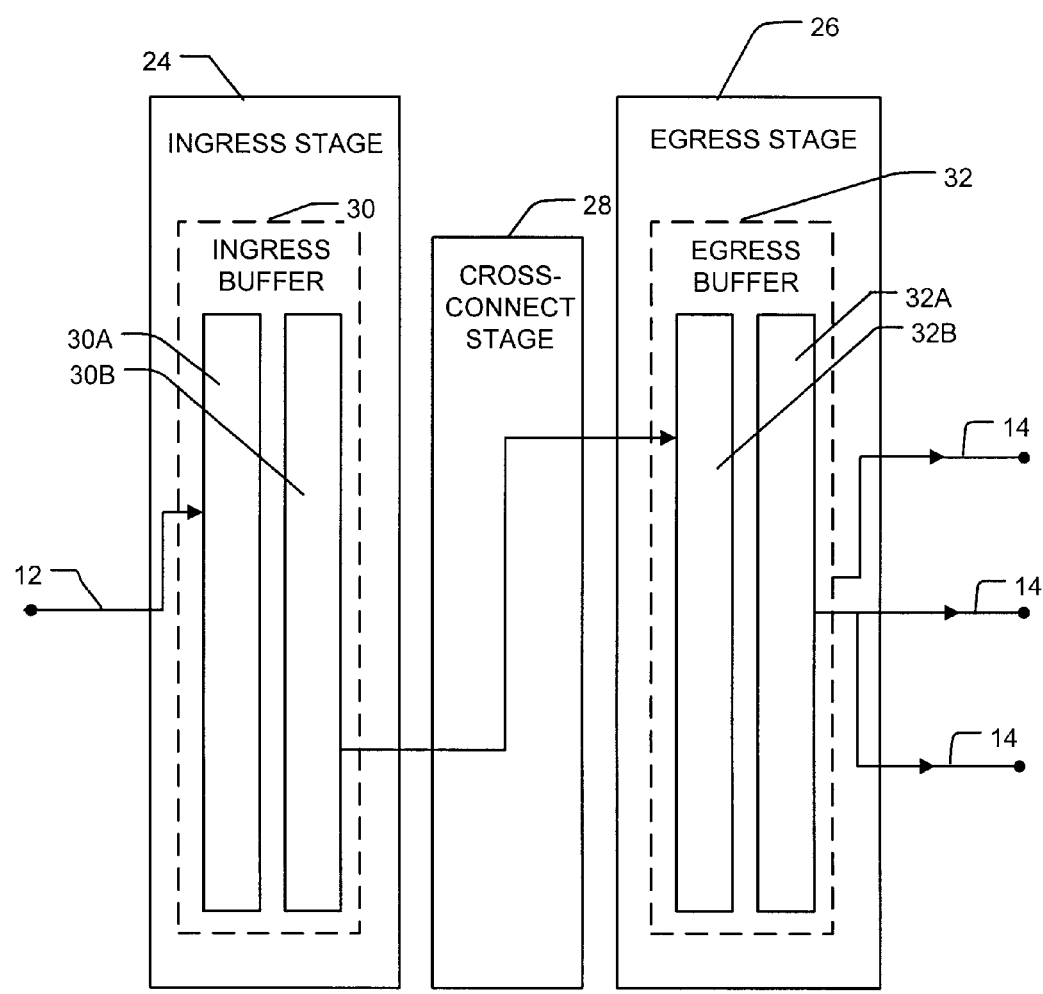
FIG. 3 is a block diagram illustrating a possible arrangement for ingress and egress buffers.

As shown in FIG. 3, each of ingress buffer 30 and egress buffer 32 may comprise two parts. Ingress buffer 30 has parts 30A and 30B. In a given frame, while part 30A is being filled with incoming data, the data from part 30B is being copied to egress buffer 32 by cross-connect stage 28. Egress buffer 32 has parts 32A and 32B. In a given frame while part 32A is being filled with data by cross-connect section 28, data which was placed into part 32B by cross-connect stage 28 in the previous frame is being dispatched onto outputs 14 by egress stage 26. At the end of each frame, parts 30A and 30B switch roles. At the end of each frame parts 32A and 32B also switch roles.

As shown in FIG. 2, cross-connect section 28 comprises a connection lookup table 40. Connection lookup table 40 preferably comprises a data structure stored in a dual port memory 41 having ports 41A and 41B. Memory 41 may comprise, for example, a dual port RAM. The provision of a dual port memory 41 to hold connection lookup table 40 permits connection lookup table 40 to be updated by way of an update port 41A while cross-connect section 28 remains operational and reads data from connection lookup table by way of a lookup port 41B.

Figure 4:
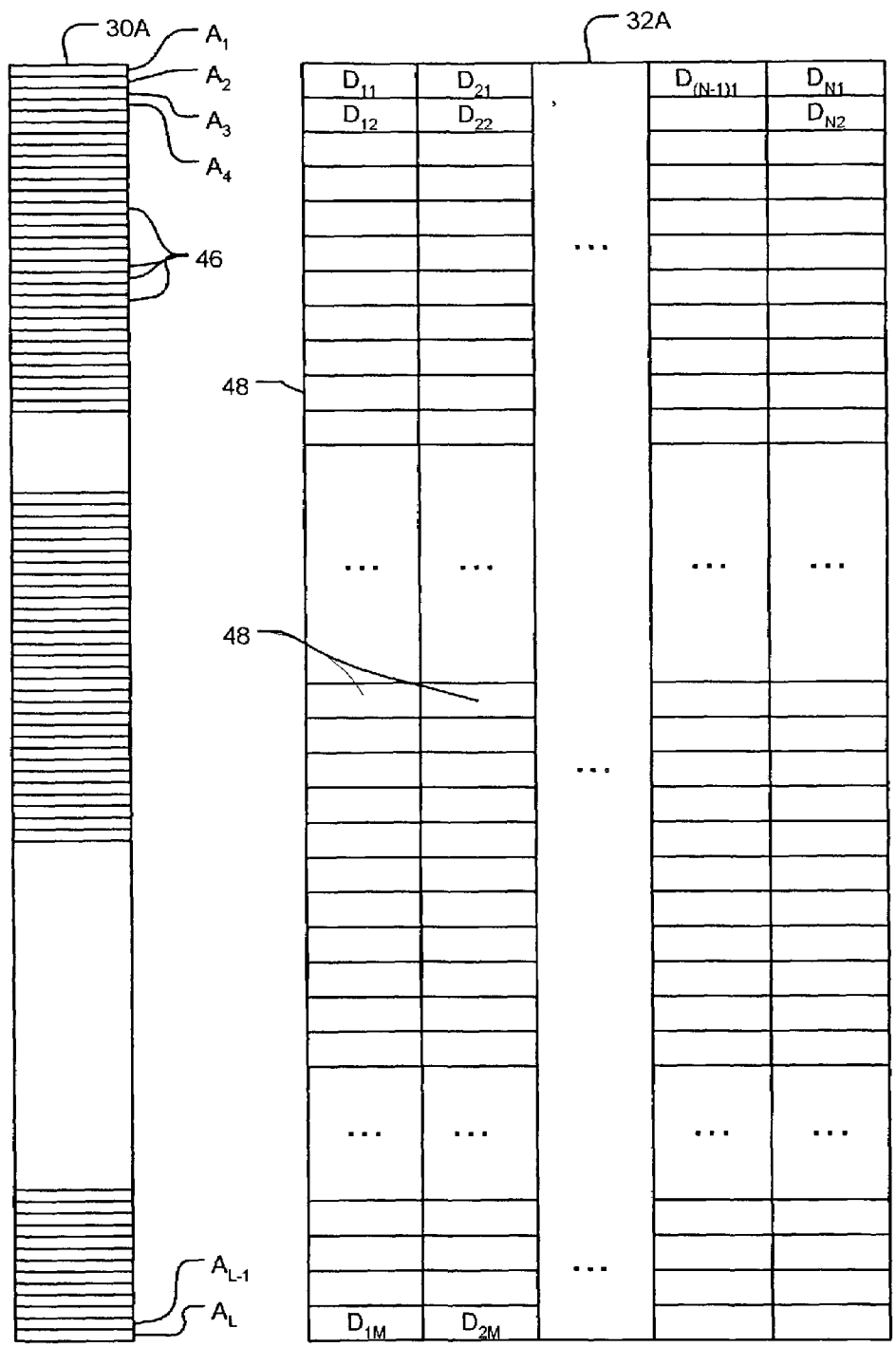
FIG. 4 is a schematic illustration of memory structures holding data from ingress timeslots and egress timeslots.

The task performed by cross-connect section 28 is illustrated conceptually in FIG. 4. At the end of a first frame, part 30A of ingress buffer 30 holds L pieces of TDM data 45 which were received at switch 10 in the L time slots 18 of the first frame. Each of the L pieces of TDM data is in a location 46.

During a second frame immediately subsequent to the first frame, cross-connect stage 28 places the appropriate data for each output timeslot 20 into an appropriate location 48 in part 32A of egress buffer 32. The information in connection lookup table 40 indicates the location in ingress buffer 30 which will be the source for data to be output in timeslots 20. Some output timeslots 20 may contain data from the same source. It is not necessary that all timeslots 20 receive data from ingress buffer 30.

Part 32A of egress buffer 32 has locations 48 for holding data to be output in timeslots 20 of output signal(s)19. Locations 48 are illustrated as being arranged in N columns, with each column corresponding to one of outputs 14. Each column has M locations 48 which each correspond to a timeslice 20 of a signal 19 of the corresponding output 14. Part 32A therefore contains M×N locations 48. It is not required that all output signals 19 have the same number of timeslices 20 in each frame.

By way of example only, an embodiment of the invention might provide 90 outputs 14 (i.e. N=90) each having a bandwidth sufficient to provide 128 time slices. In this case part 32A contains 11,520 locations 48. Only a few of those locations 48 may require data from part 30A of ingress buffer 30.

During a third frame immediately subsequent to the second frame, egress stage 26 outputs the data from part 32A of egress buffer 32.

It can be challenging to place appropriate data in each of locations 48 which requires data from part 30A of ingress buffer 30 within the time constraint imposed by the length of a frame. As shown in FIG. 2, in one embodiment of the invention, cross-connect stage 28 comprises an active connection finder 50 which identifies locations 48 which do require data from part 30A of ingress buffer 30 ("active locations"). Upon identifying an active location, active connection finder 50 places information identifying the active location into a FIFO (First In First Out) device. A connection scheduler 54 looks up the source for data for each of the active connections using data from connection lookup table 40 and places the appropriate data into each of the active locations 48.

Active connection finder 50 may comprise a memory structure 60 (see FIG. 5) comprising a set of flags with one flag corresponding to each of locations 48 (i.e. one flag corresponding to each output timeslot 20 in a frame). Each flag indicates whether or not there is a data source for the corresponding location 48. Active connection finder 50 uses the flags to identify locations 48 which have no data source (i.e. are not active locations 48) and can therefore be ignored.

Figure 5:
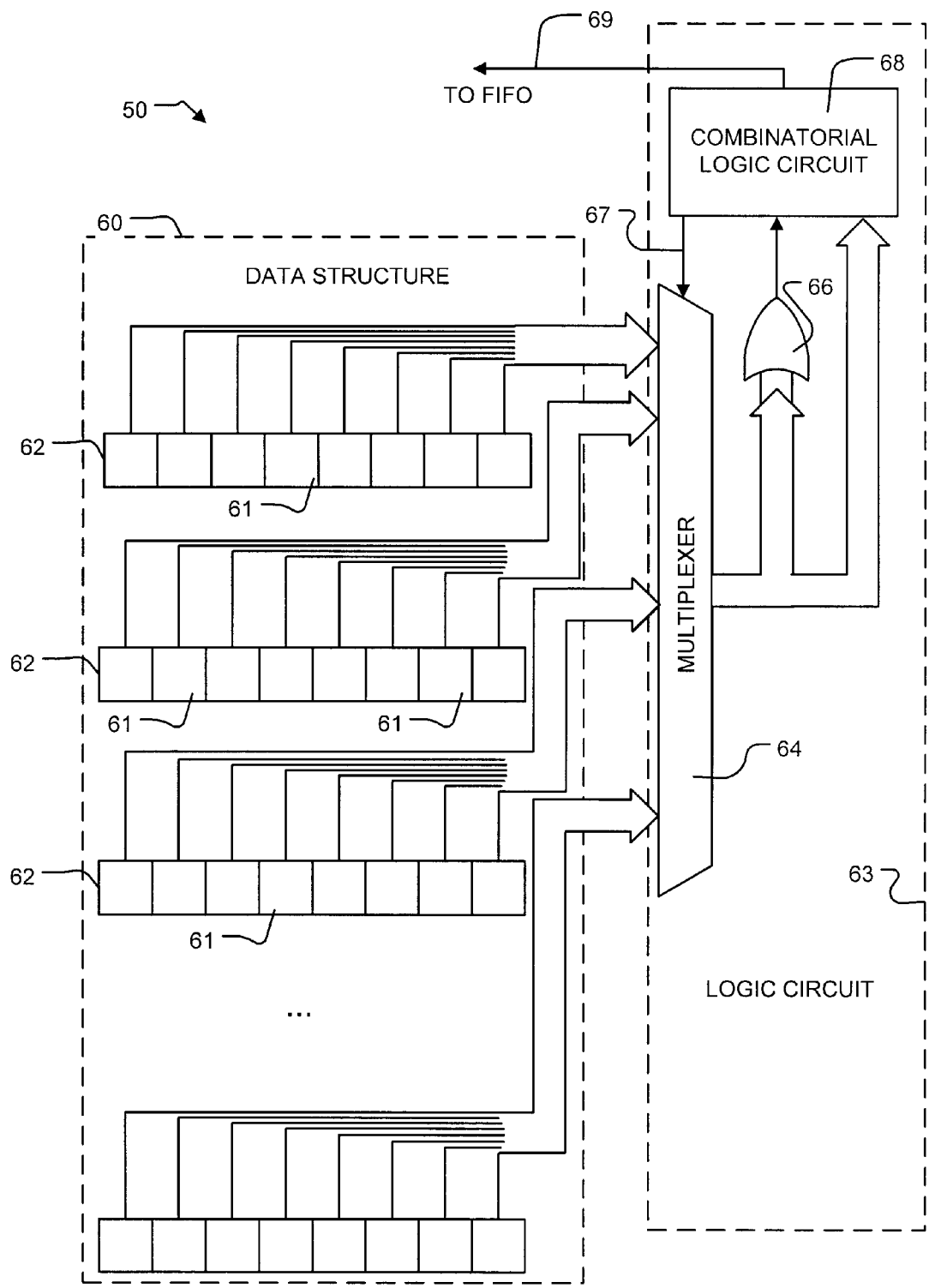
FIG. 5 is a block diagram of circuits for identifying active connections.

FIG. 5 shows a possible arrangement of data structure 60. Data structure 60 is divided into groups 62 of flags 61. Each group 62 may comprise, for example, in the range of 8 to 64 flags. In a currently preferred embodiment of the invention each group 62 comprises 32 flags 61. Each flag 61 may comprise a bit in a data store. Each group 62 may comprise an area of RAM or another suitable memory.

Logic circuits 63 are connected to read the contents of groups 62. Logic circuit 63 comprises a mechanism 66 for determining whether all of the flags 61 in a particular group 62 indicate that the corresponding locations 48 are not active locations. Mechanism 66 produces a signal representative of the logical OR of the flags 61 in a group 62. Mechanism 66 is indicated schematically in FIG. 5 by an OR gate although, in practice, mechanism 66 will typically comprise a circuit comprising multiple logic gates which produces, as output, a signal which is the logical OR of the flags 61 of the current group 62. A multiplexer 64 delivers the flag values from a selected one of groups 62 to mechanism 66.

If all of the flags in a particular group 62 correspond to locations 48 which are not active locations then no further processing is required for that group and logic circuit 63 can commence processing the next group.

If mechanism 66 indicates that at least one flag 61 in a particular group 62 corresponds to an active location 48 then a combinatorial logic circuit 68 identifies which flags 61 in the group 62 correspond to active locations 48. Combinatorial logic circuit 68 then forwards information identifying the active location(s) 48 to a buffer 52, which can advantageously be implemented as a FIFO (first in first out device), and selects a next group 62 of flags 61 by way of control signal 67.

Connection scheduler 54 reads the active locations from Buffer 52 and retrieves information which identifies the source of data for each of the active locations 48 from connection lookup table 40. Connection scheduler 54 then copies the data from the source to the active location 48. Connection scheduler 54 needs only to look up active locations 48 in connection lookup table 40 since only active locations are identified in the information in buffer 52.

System 10 may be implemented on a field programmable gate array (FPGA) or an Application Specific Integrated Circuit (ASIC). The invention may be embodied in a set of instructions for configuring an FPGA or creating an ASIC to provide apparatus according to the invention. The set of instructions may be in a suitable hardware description language (HDL) and may be recorded on any suitable computer readable medium. Dual port memory 41 may be integral with the FPGA.

Figure 6:
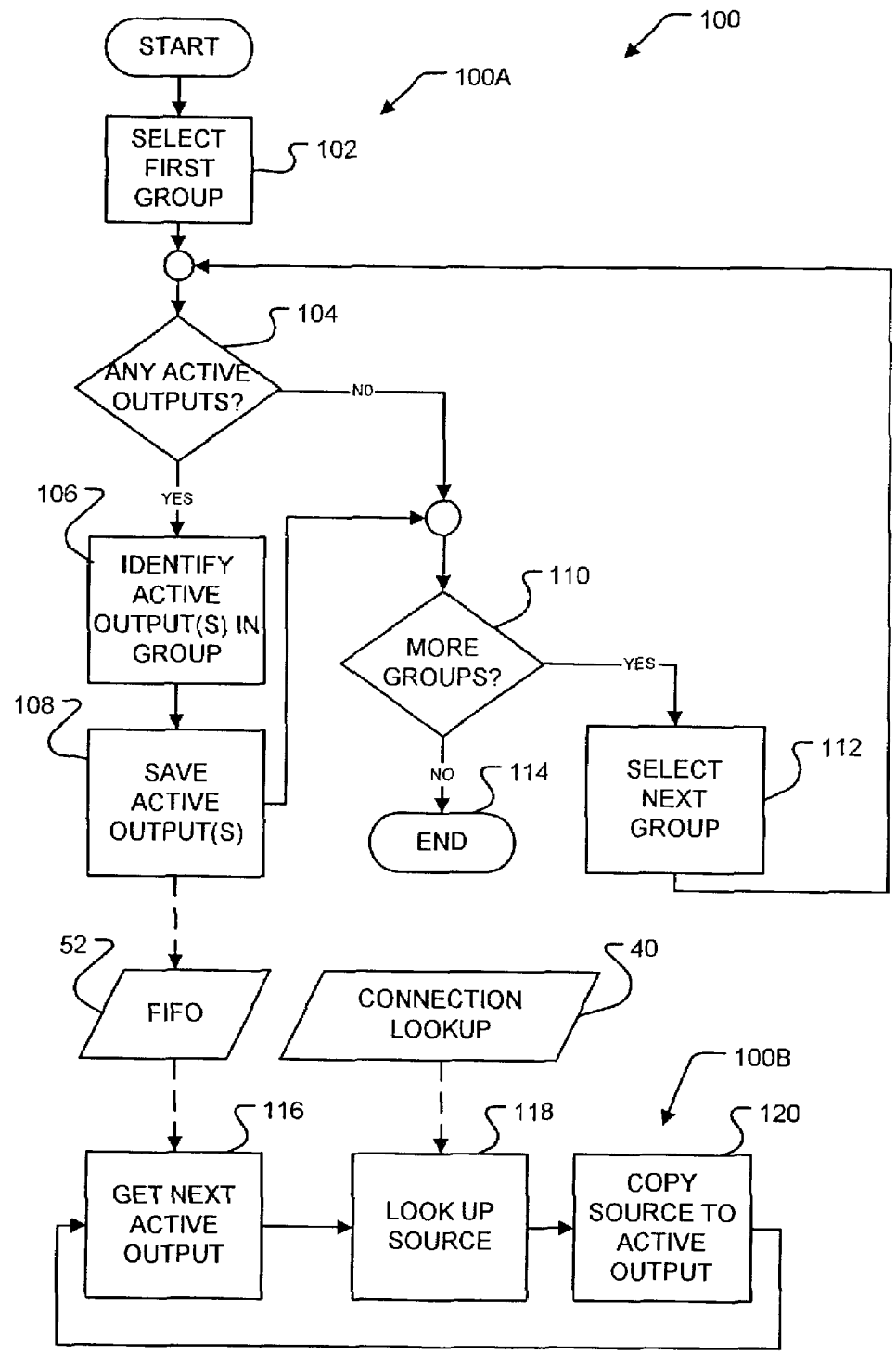
FIG. 6 is a flow chart illustrating a method according to the invention.

FIG. 6 illustrates a method 100 for operating a cross-connect stage in a switch according to the invention. Method 100 has two parts. Part 100A identifies outputs for which there is a data source. Part 100B copies data from the appropriate data sources to those outputs which have a data source. Parts 100A and 100B execute concurrently.

Part 100A begins at block 102 by selecting a first block of outputs to consider. Block 102 may comprise selecting a first group 62 of flags 61. Block 104 determines if the currently selected group of outputs includes any active outputs. If not then part 100A proceeds to block 110. If so then part 100A proceeds to block 106 which identifies any active outputs in the group. There may be several active outputs in the group. In block 108 any active outputs identified in block 106 are saved. Block 106 may, for example, save information identifying the active outputs in buffer 52.

Part 100A continues at block 110. If at block 110 there are no other groups to consider then part 100A ends. If there are other groups to consider then part 100A proceeds to block 112 which selects a next group and loops to block 104 to begin processing the next group.

Part 100B waits at block 116 until there is an active output identified in buffer 52. Block 116 retrieves the information identifying the next active output from buffer 52 and passes that information to block 118 which looks up the source for data for the active output in connection lookup table 40. Block 120 then copies data from the source (in ingress buffer 30) to the active output (a location in egress buffer 32). Multiple active outputs could have the same data source. Part 100B then loops back to block 116.

In cases where there is an upper limit to the number of connections that system 10 is capable of processing during each frame, system 10 may maintain a count of active locations 48 and signal an alarm if a number of active locations 48 exceeds a threshold.

Those skilled in the art will understand that there are a vast number of possible circuit constructions that could be used to implement this invention. In its broader aspects, this invention is not limited to specific circuit constructions.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Figure 7:
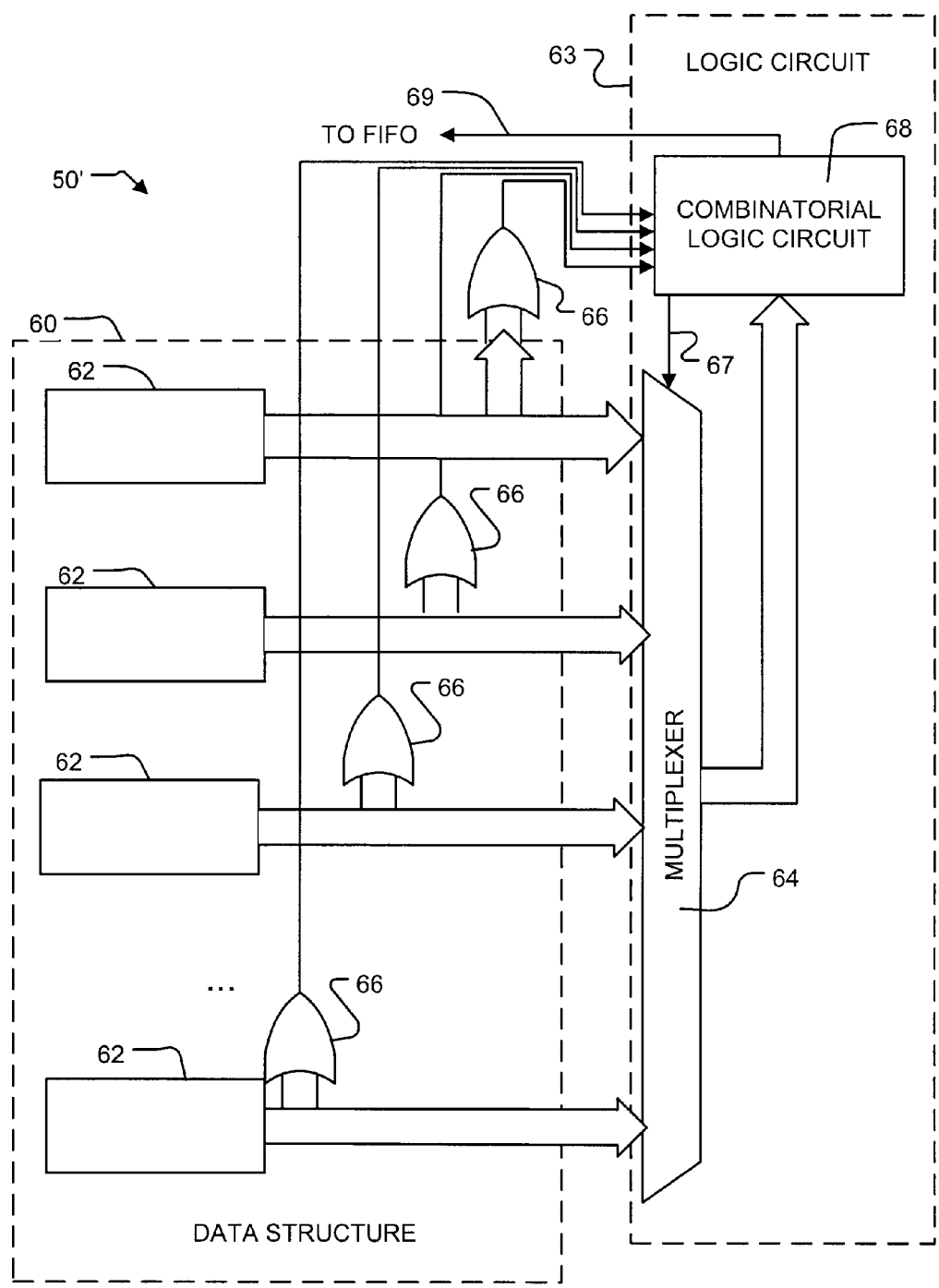
FIG. 7 is a block diagram of an active connection finder circuit according to an alternative embodiment of the invention.

As will be apparent to those skilled in the art in the light of the foregoing disclosure, many alterations and modifications are possible in the practice of this invention without departing from the spirit or scope thereof. For example:

- The order in which active locations are retrieved from buffer 52 may be varied. For example, at a time where there are references to more than one active location 48 in buffer 52 then the references could be provided to connection scheduler 54 in an order different from the order in which they were placed into buffer 52. It is not essential that buffer 52 be a FIFO as described above. Buffer 52 could comprise another device which receives references and makes them available to connection scheduler 54.
- It is not essential that each of flags 61 consist of one bit. Flags 61 may comprise any practical data representations capable of at least two states.
- A mechanism 66 could be provided for each group 62 of flags 61 as shown, for example in the active connection finder 50' of FIG. 7;
- Connection lookups may be organized in a content addressable memory (CAM) to increase research speed.
- Data may be stored in ingress stage 24 and egress stage 26 in any suitable organized manner.
- Individual elements described herein may be replaced with one or more elements which provide the same function.
- The invention may be applied in switching data of various types. For example, input(s) 12 may receive any data that arrives at a constant bit rate. Some examples of such data are asynchronous transfer mode (ATM), constant bit-rate (CBR) traffic and MPEG1 video traffic.

Accordingly, the scope of the invention is to be construed in accordance with the substance defined by the following claims.

What is claimed is:

1. A method for switching data to timeslots of one or more outgoing TDM signals, the method comprising:
   maintaining a set of flags, the flags indicating whether there is a data source for each of a plurality of available timeslots of the outgoing TDM signals;
   from the set of flags, identifying a number of timeslots of the outgoing TDM signals for which there are data sources;
   looking up each of the number of timeslots of the outgoing TDM signals in a cross-connect lookup table to identify a data source corresponding to each of the number of timeslots of the outgoing TDM signals;
   for each of the number of timeslots of the outgoing TDM signals, copying data from the data source to a location corresponding to the timeslot of the outgoing TDM signal; and,
   looking up each of the number of timeslots of the outgoing TDM signals in the cross-connect lookup table in an order which is the same as an order in which the number of timeslots of the outgoing TDM signals for which there are data sources is identified.

2. The method of claim 1 comprising, upon identifying a timeslot of one of the outgoing TDM signals for which there is a data source, placing information identifying that timeslot into a FIFO and retrieving the information from the FIFO before looking up the corresponding timeslot in the cross-connect lookup table.

3. The method of claim 1 wherein the cross-connect lookup table comprises a data structure in a multiple port memory and the method comprises writing new cross-connect information to the data structure by way of one port of the multiple port memory during times which over lap with looking up the timeslots in the cross-connect lookup table by way of another port of the multiple port memory.

4. The method of claim 3 wherein the multiple port memory comprises a dual port RAM memory.

5. The method of claim 1 wherein the data sources comprise timeslots of one or more incoming TDM signals.

6. The method of claim 5 wherein the outgoing TDM signals comprise a number of timeslots which exceeds a number of timeslots of the incoming TDM signals by at least a factor of five.

7. The method of claim 5 wherein copying data from the data source to the location is performed by a connection scheduler, the outgoing TDM signals comprise a number of timeslots which exceeds a maximum capacity of the connection scheduler to schedule connections.

8. The method of claim 5 comprising:
in a first frame, receiving the incoming TDM signals and placing data from the timeslots of the incoming TDM signals into an ingress buffer;
in a second, subsequent, frame, performing the copying data from the data source to a location corresponding to the timeslot of the outgoing TDM signal by copying data from locations in the ingress buffer to locations in an egress buffer; and,
in a third, subsequent, frame copying the data from the locations in the egress buffer to corresponding timeslots of the one or more outgoing TDM signals.

9. The method of claim 8 wherein identifying a number of timeslots of the outgoing TDM signals for which there are data sources comprises, for each of a plurality of groups of the flags:
determining whether any one or more flags in the group indicates that there is a data source for a corresponding timeslot of the output TDM signals; and,
if so, locating those one or more flags within the group which indicate that there is a data source for a corresponding timeslot of the output TDM signals.

10. The method of claim 9 wherein each of the groups comprises 8 to 64 flags.

11. The method of claim 10 wherein each of the groups comprises 32 flags.

12. The method of claim 8 wherein the ingress buffer comprises a plurality of parts and the method comprises,
in the first frame, placing data from the timeslots of the incoming TDM signals into a first part of the ingress buffer; and,
in the second frame, while copying the data from the locations in the first part of the ingress buffer to the locations in the egress buffer, receiving the incoming TDM signals and placing data from the timeslots of the incoming TDM signals into a second part of the ingress buffer.

13. The method of claim 12 wherein the egress buffer comprises a plurality of parts, and the method comprises:
in the second frame, copying the data to locations in a first part of the egress buffer; and,
in the third frame, while copying the data from the locations in the first part of the egress buffer to corresponding timeslots of the one or more outgoing TDM signals, copying data from data sources to a second part of the egress buffer.

14. The method of claim 1 wherein identifying a number of timeslots of the outgoing TDM signals for which there are data sources comprises, for each of a plurality of groups of the flags:
determining whether any one or more flags in the group indicates that there is a data source for a corresponding timeslot of the output TDM signals; and,
if so, locating those one or more flags within the group which indicate that there is a data source for a corresponding timeslot of the output TDM signals.

15. The method of claim 14 wherein each of the groups comprises 8 to 64 flags.

16. A timeslot interchange switch comprising a ingress buffer, an egress buffer and a cross connect stage; the cross connect stage comprising:
a memory for storing a set of flags, the set of flags including a flag corresponding to each of a plurality of available timeslots;
an active connection finder circuit connected to the flags and operative to generate signals identifying any flags in the set of flags which are set to indicate that a corresponding one of the plurality of timeslots is active;
a connection scheduler circuit responsive to the signals from the active connection finder circuit and operative to look up a location of a data source for each of the active timeslots and to copy data from the data source to a location in the egress buffer corresponding to the active timeslot;
wherein the set of flags comprises a plurality of groups of flags and the active connection finder circuit comprises a multiplexer operable to connect a selected one of the groups to a mechanism having an output carrying a signal representing a logical OR of the flags in the selected one of the groups.

17. The timeslot interchange switch of claim 16 comprising a buffer connected between the active connection finder circuit and the connection scheduler circuit, the buffer carrying the signals from the active connection finder circuit to the connection scheduler circuit.

18. The timeslot interchange switch of claim 16 wherein the buffer comprises a FIFO.

19. The timeslot interchange switch of claim 16 comprising a memory containing a connection lookup table and accessible to the connection scheduler circuit.

20. The timeslot interchange switch of claim 19 wherein the memory comprises a multi-port memory.

21. The timeslot interchange switch of claim 20 wherein the memory comprises a dual port RAM.

22. The timeslot interchange switch of claim 16 comprising a logic circuit connected to generate signals identifying all flags in the selected one of the groups which are set to indicate that the corresponding one of the plurality of timeslots is active.

23. The timeslot interchange switch of claim 22 comprising a buffer connected between the logic circuit and the connection scheduler circuit, the buffer passing the signals from the active connection finder circuit to the connection scheduler circuit.

24. The timeslot interchange switch of claim 23 wherein the buffer comprises a FIFO.

25. The timeslot interchange switch of claim 16 wherein a number of the available timeslots exceeds a capacity of the connection scheduler circuit.

* * * * *